(12) United States Patent
Liao et al.

(10) Patent No.: US 6,442,508 B1
(45) Date of Patent: Aug. 27, 2002

(54) METHOD FOR INTERNAL MECHANICAL COMPONENT CONFIGURATION DETECTION

(75) Inventors: Reynold L. Liao, Austin; Sean P. O'Neal, Round Rock; Damon W. Broder, Austin, all of TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/452,962

(22) Filed: Dec. 2, 1999

(51) Int. Cl.[7] ............................................... G06F 15/74
(52) U.S. Cl. ...................................................... 702/186
(58) Field of Search ................................ 702/186, 185, 702/189; 701/35; 709/201, 217, 230; 714/785

(56) References Cited

U.S. PATENT DOCUMENTS

| | | | |
|---|---|---|---|
| 4,757,463 A | * 7/1988 | Ballou et al. | 701/35 |
| 5,522,081 A | 5/1996 | Carls | 395/750 |
| 5,526,493 A | 6/1996 | Shu | 395/281 |
| 5,568,610 A | 10/1996 | Brown | 395/185.01 |
| 5,590,363 A | 12/1996 | Lunsford et al. | 395/800 |
| 5,637,991 A | 6/1997 | Brown et al. | 323/282 |
| 5,671,131 A | 9/1997 | Brown | 363/56 |
| 5,818,200 A | 10/1998 | Cummings et al. | 320/116 |
| 5,862,368 A | 1/1999 | Miller et al. | 395/553 |
| 5,991,158 A | 11/1999 | Chan et al. | 361/736 |
| 6,295,567 B1 | 9/2001 | Bassman et al. | 710/104 |

OTHER PUBLICATIONS

Gary Kitten and Ajay Kwatra; Computer With A Chassis Intrusion Detector; Filed Mar. 15, 1999; U.S. Ser. No.: 09/268,771; 18 pages of Specification (including Claims and Abstract); 2 pages of Figures. (Copy Enclosed).

Steve Belt; John Pate; and Greg Hudgins; Automatic IR Port Detection And Switching; Filed Apr. 15, 1998 U.S. Ser. No.: 09/060,735; 13 pages of Specification (including Claims and Abstract); 3 pages of Figures. (Copy Enclosed).

Reynold Liao, Mark White, Sean O'Neal; Detection Scheme For Compact Disk Or Digital Video Disk Media Proper Installation; Filed Nov. 9, 1998; U.S. Ser. No.: 09/189,413; 20 pages of Specification (including Claims and Abstract); 5 pages of Figures. (Copy Enclosed).

\* cited by examiner

*Primary Examiner*—Kamini Shah
(74) *Attorney, Agent, or Firm*—Baker Botts L.L.P.

(57) ABSTRACT

A system and method for detecting a mechanical component and thereby verify any warranty covering the mechanical component includes encoding a mechanical component, identifying an attribute of the mechanical component via the encoding, providing the attribute to detection logic located on a system board, the detection logic providing the attribute to a configuration diagnostic system. A method of detecting warranty violations further includes providing a mechanical component with a unique identifier and transmitting identifying data to diagnostic software that includes a log or marker capable of detecting and logging changes in the mechanical component. The method further includes transmitting the data identifying the change in the mechanical component via a network connection to warranty verification software. A computer system includes a processor coupled to a bus, at least one memory coupled to the bus, a plurality of input/output devices coupled to the bus, an operating system stored in memory, and a mechanical component encoded to identify an attribute of the mechanical component via the encoding. The computer system includes a system board including detection logic that provides the attribute to a configuration diagnostic system.

30 Claims, 4 Drawing Sheets

METHOD FOR INTERNAL MECHANICAL COMPONENT CONFIGURATION DETECTION

BACKGROUND OF THE INVENTION

1. Field of the Invention

This invention relates generally to the manufacturing of computer systems and to an efficient system and method for detecting mechanical component configurations.

2. Description of the Related Art

Personal computer systems have attained widespread use. These personal computer systems now provide computing power to many segments of today's modern society. A personal computer system can usually be defined as a desktop, floor-standing, or portable microcomputer that includes a system unit having a system processor or central processing unit (CPU) with associated memory, a display panel, a keyboard, a hard disk storage device or other type of storage media such as a floppy disk drive or a compact disk read only memory (CD ROM) drive. These personal computer systems are information handling systems which are designed primarily to give independent computing power to a single user or group of users and are inexpensively priced for purchase by individuals or small businesses.

A portable computer is a self-contained personal computer designed to be easily moved to and operated in various locations. Portable computers are often referred to as laptop, notebook or subnotebook computers. To be portable, these computers are small, compact, and lightweight. The conventional portable computer comprises a base portion and a lid portion that pivotally opens from the base portion when the portable computer is in use. The lid portion contains a flat panel display such as a liquid crystal display (LCD) or other relatively small display. Recently, portable computers have become popular alternatives to traditional desktop or floor standing computer systems.

In a computer manufacturing and customization environment, quality control includes confirmation that electronic components and mechanical components are properly configured according to specifications. Accordingly, electronic components are in a computer system are confirmed through detection circuitry. The detection circuitry allows factory diagnostic software to confirm that electronic components in a computer system conform to specifications.

Confirmation that mechanical components properly adhere to specifications is typically accomplished through a manufacturer visually inspecting each computer system because there is no detection mechanism available for automatic detection.

Increasing interest by consumers in computer systems with the cosmetic appearance of computer systems highlights the necessity for automatic detection of mechanical components.

SUMMARY OF THE INVENTION

It has been discovered that mechanical components in a computer system are automatically detectable through encoding of mechanical parts. Accordingly, a method for detecting a mechanical component includes encoding a mechanical component, identifying an attribute of the mechanical component via the encoding, providing the attribute to detection logic located on a system board, the detection logic providing the attribute to a configuration diagnostic system.

A method of detecting warranty violations includes providing a mechanical component with a unique identifier and transmitting identifying data to diagnostic software. The diagnostic software includes a log or marker capable of detecting and logging changes in the mechanical component. The method further includes transmitting the data identifying the change in the mechanical component via a network connection.

A computer system includes a processor coupled to a bus, at least one memory coupled to the bus, a plurality of input/output devices coupled to the bus, an operating system stored in memory, and a mechanical component encoded to identify an attribute of the mechanical component via the encoding. The computer system includes a system board including detection logic that provides the attribute to a configuration diagnostic system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
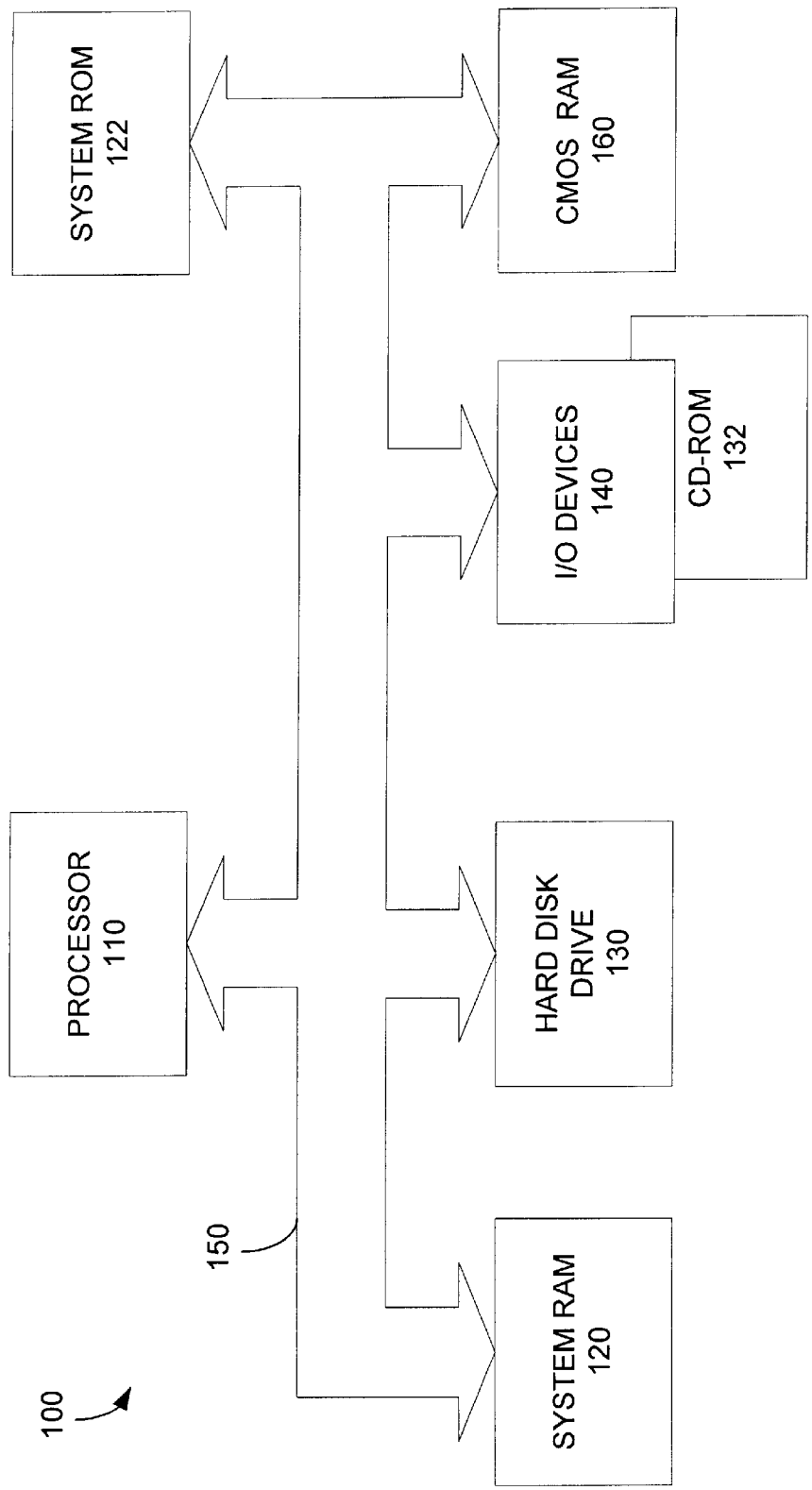
FIG. 1 is a schematic diagram of a computer system in accordance with the present invention.

Referring to FIG. 1, a block diagram shows computer system 100 that is suitably configured for the embodiments of the present invention. The computer system 100, typically a personal computer or personal notebook computer, includes a processor 110, a system random access memory (RAM) 120, a system ROM 122, a CD-ROM drive 132, and various other input/output devices 140. The computer system 100 is shown to include a hard disk drive 130 connected to the processor 110 although some embodiments do not include the hard disk drive 130. Optionally, computer system 100 includes a bootable operating system compact disk (CD) for use with a computer system with or without a hard disk drive installed and formatted. Such a CD is useful when the computer system 100 either does not include a hard disk drive 130 or the hard disk drive 130 does not have an operating system, for example the Windows NT™ operating system, installed on the hard disk drive 130.

The processor 110 communicates with the system components via a bus 150 which includes data, address and control lines. A CMOS clock nonvolatile RAM 160, which is connected to the processor 110 via the bus 150, is typically utilized to store information even when power to the computer system 100 is interrupted. Computing operations are stored in a storage device such as the hard disk drive 130 or the system ROM 122 connected to the processor 110. The processor 110, for example a Pentium™ processor, executes the computing operations of the computer system 100.

In the manufacturing environment of computer system 100, each computer system 100 is checked via a factory diagnostic system check using diagnostic software. The diagnostic software checks the system electronic configuration against an order form listing the system electronic components ordered for the computer system 100. The diagnostic software responds to detection circuitry associated with the electronic components within computer system 100 and confirms that electronic components are properly configured and conform to specifications listed on the order form. Accordingly, electronic components are in a computer system are confirmed through detection circuitry.

Recent developments in the computer manufacturing environment have increased the number of non-electronic, mechanical components in computer system 100 that require configuration checking. For example, the specifications for computer system 100 may include a certain color configuration of keyboard, chassis and display. Diagnostic software intended for checking electronic component configurations responds to logic detection circuitry associated with electronic components and is incapable of checking items that are only mechanically or cosmetically different from similarly electronically configured computer systems. Moreover, computer systems that have a common chassis color and differ in only one or more cosmetic features are becoming more commonplace with misconfiguration detection more difficult.

Figure 2:
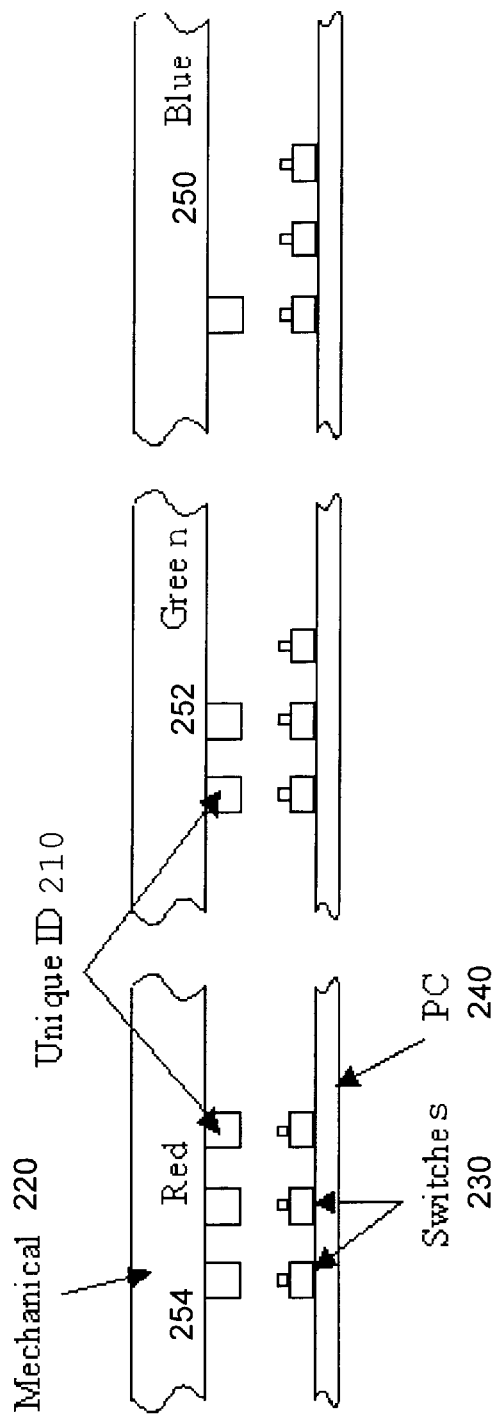
FIG. 2 is a schematic diagram of an embodiment of an encoding of a mechanical component in accordance with the present invention.

Referring to FIG. 2, an embodiment of the present invention shows a mechanical component 200 encoded to be read by electrical switches 230 appropriately placed to make contact with the encoded mechanical component 220. The switches 230 are coupled to diagnostic circuitry and software that determine whether the mechanical component 220 conforms to the specifications for the computer system 100. As shown in FIG. 2, a cosmetic difference such as the color of a chassis or other computer component can be detected using an encoding system. For example, three switch activators 254 represent the color "red"; two switch activators 252 represent the color "green"; and one switch activator 250 represents the color "blue". One of skill in the art will appreciate that the number of switch activators and the pattern of switch activators can be altered according to the number of identifiable differences among the mechanical components. The identifying feature of color is shown for illustration purposes only. For example, an identifiable difference between computer systems could be a palm rest or liquid crystal display with different shapes or colors.

According to another embodiment of the present invention, instead of switch activators 250, the mechanical component 220 optionally includes conductive pads or clips. Instead of mechanically activating switches 230, the conductive pads or clips activate pads on a system board of the PC 240. Alternatively, an embodiment includes printing a unique pattern on mechanical component 220 using conductive ink, such as silver ink. According to this embodiment, the system board includes spring-based contacts capable of reading the pattern and transmitting the identifying feature to the diagnostic logic circuitry.

The switches 230 are shown attached to the personal computer (PC) 240. The switches 230 are coupled to diagnostic logic circuitry (not shown), the diagnostic logic circuitry providing information to diagnostic software. The diagnostic software identifies which mechanical component is installed on the computer system 100 through the switches 230. Accordingly, a computer user, such as user checking the computer system 100 against a specification can confirm proper installation of mechanical components. A user of a computer system coupled to computer system 100 via a network connection also verifies the features of various mechanical components using the diagnostic software. One of ordinary skill in the art will appreciate that many mechanical components on PC 240 are appropriate for the embodiment herein described. One of ordinary skill in the art will appreciate with the benefit of the disclosure herein presented that the diagnostic software can incorporate the identification of features of mechanical components via the logic of the switches.

Figure 3:
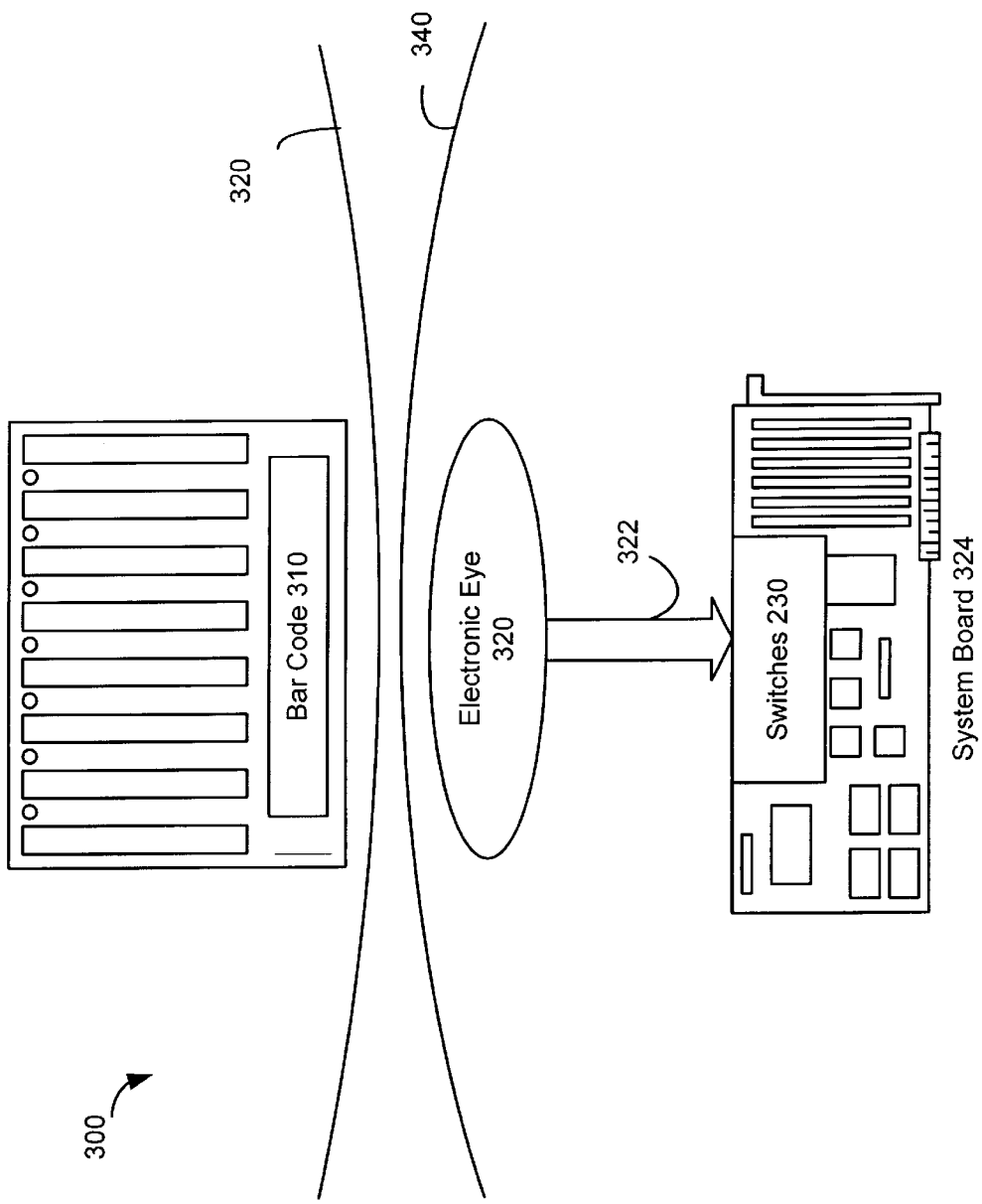
FIG. 3 is a schematic diagram of an embodiment showing bar code encoding of a mechanical component in accordance with the present invention.

Referring now to FIG. 3, a schematic diagram 300 shows another embodiment of the invention. More specifically, mechanical component includes a bar code 310 uniquely identifying a feature of the mechanical component. The bar code 310 is read by an electronic eye 320 when the PC 240 comes into visible contact with the bar code 310. Thus, for example, bar code 310 is optionally placed on a mechanical component such as a lid portion 320 of a notebook computer. The electronic eye 320 reads the bar code 310 from a chassis portion 340 of the notebook computer. The data read by the electronic eye 320 is transmitted via path 322 to switches 230 that are coupled to a system board 324. The switches 230 are operably coupled to diagnostic software that indicate to a user of diagnostic software the features of the mechanical component. Accordingly, features that are not electronic in nature are checked for accuracy. For example, a customer orders a notebook computer with a lid portion 320 in the color red. A diagnostic check of the notebook computer via a network connection to the diagnostic software confirms that the notebook computer has a red lid portion 320.

Figure 4:
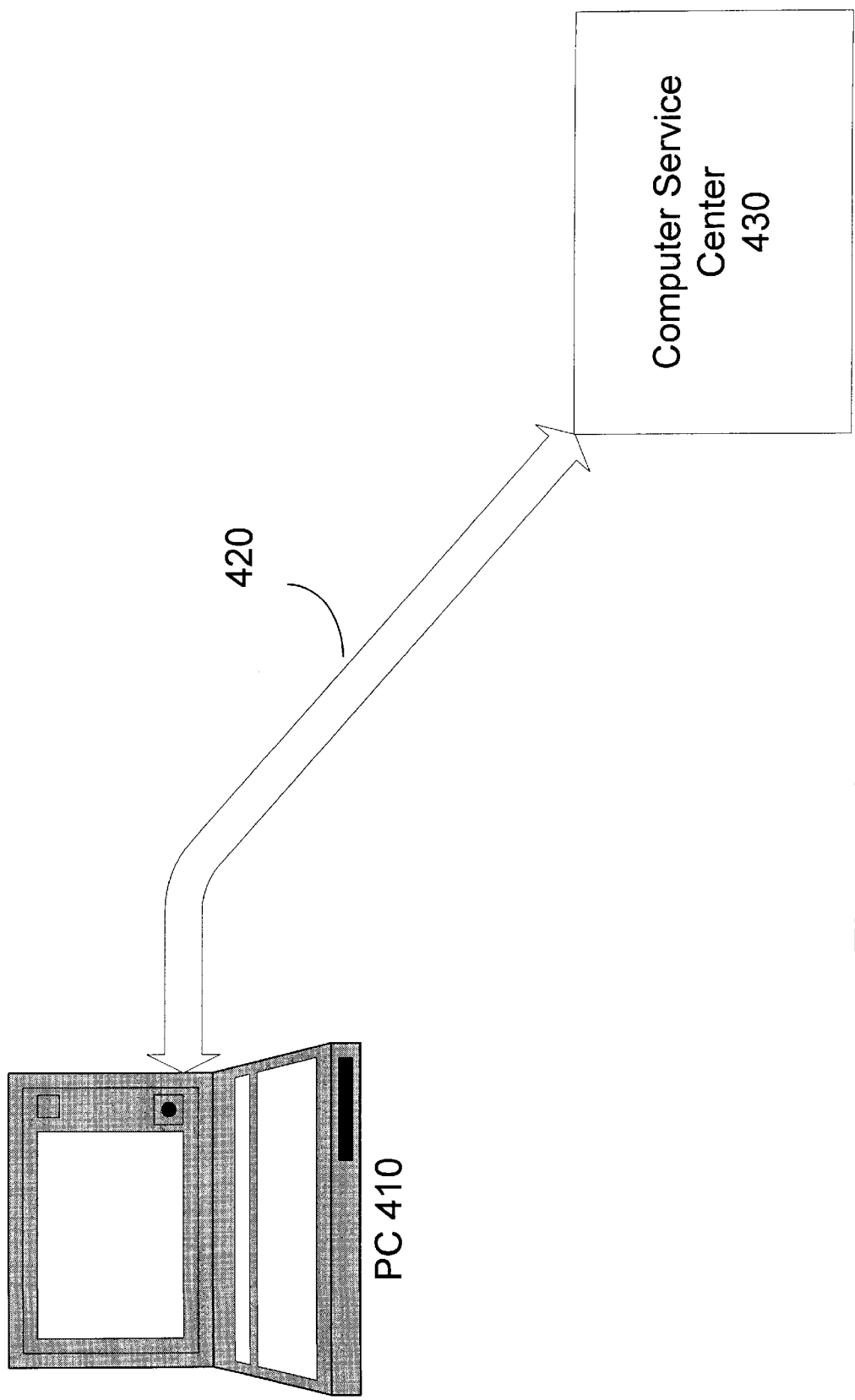
FIG. 4 is a block diagram of an embodiment related to the encoding of a mechanical component in accordance with the present invention.

Referring now to FIG. 4 in combination with FIG. 2 and FIG. 3, a further embodiment of the present invention is described. FIG. 4 shows PC 410 coupled to Computer Service Center 430 via a network connection 420. According to an embodiment of the present invention, diagnostic software within PC 410 is able to confirm whether mechanical component 220 has been replaced, thereby voiding warranty agreements between a manufacturer and a computer purchaser. More specifically, a manufacturer practicing the disclosed invention in accordance with FIGS. 2 and 3 described above determines that a computer user altered a mechanical component subject to a warranty agreement prohibiting alteration through the diagnostic software. Such alteration is discoverable if the mechanical component no longer provides the logic to switches 230 that identify the features of the mechanical component. For example, if a mechanical component includes a unique identifier 210 coupled to switches 230, and a computer user changes the mechanical component in a way that alters the unique identifier 210, the diagnostic software detects the change. A mechanical component that is replaced by another mechanical component supplied by a party unknown to the manufacturer is, therefore, discovered. By way of example, a user purchasing a palm rest to replace a factory-supplied palm rest would be discovered because the unique identifier 210 located on the factory-supplied palm rest would no longer transmit the logic expected by the diagnostic software. The diagnostic software optionally includes a marker or log identifying such changes. Upon the user's contacting the manufacturer via a network connection 420, the computer service center 430 detects the marker or reads the log generated by the diagnostic software. Any warranty violations are thereby discovered.

Accordingly, a method of detecting warranty violations includes providing a mechanical component with a unique identifier and transmitting identifying data to diagnostic software. The diagnostic software includes a log or marker capable of detecting and logging changes in the mechanical component. The method further includes transmitting the data identifying the change in the mechanical component via a network connection. Warranty verification software reads the data via the network connection.

Although the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims. In the claims, unless otherwise indicated the article "a" is to refer to "one or more than one."

What is claimed is:

1. A method for detecting a mechanical component configuration in a computer system, the method comprising:
   encoding a mechanical component;
   identifying an attribute of the mechanical component via the encoding; and
   providing the attribute to detection logic located on a system board, the detection logic providing the attribute to a configuration diagnostic system.

2. The method of claim 1 further comprising:
   placing an activating member on the mechanical component, wherein the activating member activates a switch in the computer system, the configuration of the activating member identifying the attribute of the mechanical component.

3. The method of claim 2 wherein the switch is operably coupled to the detection logic.

4. The method of claim 2 wherein the activating member includes a series of tabs, the series of tabs that uniquely identify the attribute of the mechanical component.

5. The method of claim 4 wherein the series of tabs are arranged in one of a plurality of predetermined patterns, each of the patterns of the predetermined patterns identifying an attribute of the mechanical component.

6. The method of claim 2 wherein the activating member includes a conductive member, the conductive member uniquely identifying the attribute of the mechanical component upon conductive coupling with the switch.

7. The method of claim 6 wherein the conductive member includes conductive ink placed on the mechanical component in a unique pattern, the conductive ink adapted to contact the switch via at least one spring member on the system board, the unique pattern identifying the attribute.

8. The method of claim 2 wherein the activating member includes an optically readable code.

9. The method of claim 8 wherein the optically readable code is a bar code.

10. A method for verifying warranty data of a computer system, the method comprising:
    encoding a mechanical component;
    identifying an attribute of the mechanical component via the encoding;
    providing the attribute to detection logic located on a system board, the detection logic providing the attribute to diagnostic software; the diagnostic software identifying any change in the mechanical component via changes in the encoding, the diagnostic software logging the changes; and
    transmitting the logged changes in the mechanical component via a network connection.

11. The method of claim 10 wherein the network connection is an Internet connection.

12. The method of claim 10 further comprising:
    reading the logged changes by warranty verification software via the network connection.

13. The method of claim 10 wherein the mechanical component is one of a plurality of mechanical components with encoded attributes.

14. A computer system comprising:
    a processor coupled to a bus;
    at least one memory coupled to the bus;
    a plurality of input/output devices coupled to the bus; and
    an operating system stored in memory;
    a mechanical component encoded to identify an attribute of the mechanical component via the encoding; and
    a system board including detection logic that provides the attribute to a configuration diagnostic system.

15. The computer system of claim 14 further comprising:
    an activating member on the mechanical component, wherein the activating member activates a switch in the computer system, the configuration of the activating member identifying the attribute of the mechanical component.

16. The computer system of claim 14 wherein the configuration of the switch identifies the attribute, the switch being operably coupled to the detection logic.

17. The computer system of claim 14 wherein the switch is operably coupled to the detection logic.

18. The computer system of claim 15 wherein the activating member includes a series of tabs, the series of tabs uniquely identifying the attribute of the mechanical component.

19. The computer system of claim 18 wherein the series of tabs are arranged in one of a plurality of predetermined patterns, each of the patterns of the predetermined patterns identifying an attribute of the mechanical component.

20. The computer system of claim 15 wherein the activating member includes a conductive member, the conductive member uniquely identifying the attribute of the mechanical component upon conductive coupling with the switch.

21. The computer system of claim 20 wherein the conductive member includes conductive ink placed on the mechanical component in a unique pattern, the conductive ink adapted to contact the switch via at least one spring member on the system board, the unique pattern identifying the attribute.

22. The computer system of claim 15 wherein the activating member includes an optically readable code.

23. The computer system of claim 22 wherein the optically readable code is a bar code.

24. The method of claim 10 wherein the mechanical component is of a type of a plurality of types that may be utilized in the computer system;
    wherein the attribute is an identification of the type with respect to the plurality of types;
    wherein the identifying any changes in the mechanical component includes identifying whether the type of the mechanical component is a type that is specified for the computer system.

25. The method of claim 24 wherein the type includes at least a portion of the mechanical component being of a particular color, wherein each type of the plurality includes at the least a portion of the mechanical component being of a color different from that of the other types of the plurality.

26. A method comprising:

identifying by a computer system an attribute of a mechanical component of the computer system that was encoded into the mechanical component, comparing by the computer system the attribute of the mechanical component with a previously stored attribute for the mechanical component.

27. The method of claim 26 further comprising:

logging any difference between the identified attribute and the previously stored attribute.

28. The method of claim 27 further comprising:

transmitting the logged difference to a second computer system.

29. The method of claim 28 wherein the difference is transmitted to the second computer system via a network.

30. The method of claim 29 further comprising:

determining whether a warranty agreement for the computer system has been violated based on the logged difference.

* * * * *